United States Patent [19]
Tiainen

[11] Patent Number: 6,101,250
[45] Date of Patent: Aug. 8, 2000

[54] METHOD FOR CONTROLLING AN INTELLIGENT NETWORK CALL

[75] Inventor: Vesa Tiainen, Vantaa, Finland

[73] Assignee: Nokia Telecommunications Oy, Espoo, Finland

[21] Appl. No.: 09/155,202

[22] PCT Filed: Mar. 24, 1997

[86] PCT No.: PCT/FI97/00188

§ 371 Date: Sep. 24, 1998

§ 102(e) Date: Sep. 24, 1998

[87] PCT Pub. No.: WO97/36431

PCT Pub. Date: Oct. 2, 1997

[30] Foreign Application Priority Data

Mar. 25, 1996 [FI] Finland ..................................... 961361

[51] Int. Cl.[7] ..................................................... H04M 3/42
[52] U.S. Cl. ........................... 379/207; 379/220; 379/230
[58] Field of Search ..................................... 379/268, 269, 379/279, 207, 219, 220, 221, 229, 230

[56] References Cited

U.S. PATENT DOCUMENTS 5,701,412  12/1997  Takeda et al. ....................... 379/201 X
5,878,128   3/1999  Kantola .................................... 379/230

FOREIGN PATENT DOCUMENTS

95/22231   8/1995   WIPO .

OTHER PUBLICATIONS

Advanced Intelligent Network, Release 1 Network and Operations Plan, Jun. 1990, SR–NPL–001623.
Distributed Functional Plane for Intelligent Network CS–1, ITU–T, Q. 1214, Oct. 1995.
Intelligent Network (IN): Intelligent Network Capability Set 1 (CS1), Core Intelligent Network Application Protocol (INAP) Part 1: Protocol specification, ETS 300 374–1, Jul. 1994.
Specifications of Signalling System No. 7, Introduction to CCITT Signalling System No. 7, ITU–T Recommendation Q.700, Mar. 1993.

*Primary Examiner*—Creighton Smith
*Attorney, Agent, or Firm*—IP Group of Pillsbury Madison & Sutro LLP

[57] ABSTRACT

The invention relates to a method for controlling a call attempt by employing an intelligent network. The method includes (a) processing the call attempt according to the originating half BCSM (O_BCSM) at a first point (SSP_A) having a service switching function (SSF), (b) resuming the processing of the call attempt according to the terminating half BCSM (T_BCSM) at a second point (SSP_B) with a service switching function (SSF), and (c) providing a service request from the processing that employs T_BCSM to a point (SCP) having a service control function (SCF). In order to be able to offer versatile IN services to the called subscriber as well, the processing of the call attempt is returned to the point employing the O_BCSM, and the processing is resumed according to the O_BCSM.

20 Claims, 4 Drawing Sheets

METHOD FOR CONTROLLING AN INTELLIGENT NETWORK CALL

FIELD OF THE INVENTION

The present invention relates to a method according to the preamble of the attached claim 1 for controlling a call attempt by employing an intelligent network.

BACKGROUND OF THE INVENTION

The fast development of telecommunications has made it possible for operators to provide users with a multitude of different services. A network architecture providing advanced services is referred to as an Intelligent Network, commonly abbreviated to IN. An intelligent network architecture may be applied to most telecommunication networks, such as the PSTN (Public Switched Telephone Network), PSPDN (Packet Switched Public Data Network, as well as ISDN and B-ISDN networks (Integrated Services Digital Network, Broadband ISDN). Independent of the network architecture, the purpose of intelligent network architecture is to facilitate the creation, control and management of new tele services. Present IN specifications include the Bellcore AIN Rel.1 (Advanced Intelligent Network, Release 1) and the ITU-T (formerly, CCITT) specification Capability Set 1 (CS-1).

The functional architecture of an intelligent network is illustrated by FIG. 1, in which the functional entities of the network are presented as ovals. In the following, a brief discussion will be offered of this architecture in order to make the method according to the invention easier to understand.

The end user's (subscriber's) access to the network is handled by a CCAF function (Call Control Agent Function). Access to IN services is implemented by making amendments to the existing digital exchanges. This is carried out by utilizing a BCSM (Basic Call State Model) which describes the existing functionality by which a call between two users is processed. The BCSM is a high-layer state automaton description of the CCF functions (Call Control Function) required for setting up and maintaining an inter-user connection route. By means of an SSF function (Service Switching Function), functionality is incorporated into this state model (cf. the partly overlapping elements CCF and SSF in FIG. 1), to be able to decide when services of the intelligent network (i.e. IN services) must be invoked. When these IN services have been invoked, a Service Control Function (SCF) containing the service logic of the intelligent network takes care of the service-specific handling (of a call attempt). The SSF, then, couples the CCF (Call Control Function) to the SCF (Service Control Function) and allows it to control the CCF. The SCF may e.g. request the SSF/CCF to carry out particular call or connection functions, for example charging or routing operations. The SCF may also send requests to an SDF (Service Data Function) which handles access to service-specific information and network information of the intelligent network. Thus, the SCF may e.g. request the SDF to retrieve information on a specific service or to update such information. The SDF conceals the actual implementation of the information from the SCF and offers the SCF a logical view of the information.

The operations described above are further complemented by an SRF (Specialized Resources Function), which provides specialized measures required to carry out some services offered by the intelligent network. These include protocol changes, speech recognition, voice announcements, etc. The SCF may e.g. request the SSF/CCF functions to first establish a connection between the end users and the SRF, and then request the SRF to give voice messages to the end users.

Other functional entities of the intelligent network are various kinds of management-related operations, such as SCEF (Service Creation Environment Function), SMF (Service Management Function), and SMAF (Service Management Access Function). The SMF comprises e.g. the management of services, the SMAF provides an interface to the SMF, and the SCEF enables defining, development, testing and inputting to the SMF of the IN services. As these functions are only related to the operation of the network operator, they are not shown in FIG. 1.

In the following, the role of the functional entities illustrated by FIG. 1 will be briefly described from the point of view of the IN services. The CCAF receives a service request sent by a calling party, the service request typically consisting of an offhook and/or a specific series of digits dialled by the calling party. The CCAF forwards the service request to the CCF/SSF for processing. The call control function CCF has no service information but it has been programmed to recognize service requests. The CCF interrupts call setup for a moment and informs the service switching function SSF of the call state. By utilizing predetermined criteria, the task of the SSF is to interrupt the service request, and consequently to determine whether the service request is one relating to IN services. If that is the case, the SSF forms a standardized IN service request and sends the request, with the information on the state of the service request, to the SCF. The SCF receives the request and decodes it. Following this, the SCF cooperates with the SSF/CCF, SRF and SDF to provide the end user with the service requested.

The architecture of the IN physical layer illustrates how the functional entities described above are mapped to the physical entities of the network. The physical architecture of the intelligent network is illustrated in FIG. 2, in which the physical entities are depicted as rectangles or circles and the functional entities as ovals. Signalling links are illustrated by broken lines and the actual transport, such as speech, by solid lines. Optional functional entities are marked with a broken line. The signalling network illustrated by the figure is a network in accordance with Signalling System Number 7 (SS7 is a prior art signalling system, described in the CCITT (nowadays ITU-T) Blue Book *Specifications of Signalling System No. 7*, Melbourne, 1988).

Subscriber equipments SE, e.g. a phone, computer or telefax, are coupled to the SSP (Service Switching Point) directly, or a NAP (Network Access Point).

The service switching point SSP provides a user with access to the network and handles all necessary selection functions. The SSP is also capable of detecting service requests by the intelligent network. Functionally, the SSP comprises call control and service selection features.

The network access point NAP is a conventional switching exchange, such as the applicant's DX 220, containing the CCF function and capable of distinguishing calls that require IN services from ordinary calls, and of routing the calls requiring IN services to the relevant SSP.

An SCP (Service Control Point) includes the service programs that are used for producing IN services.

An SDP (Service Data Point) is a database containing customer and network data which are used by the SCP service programs for producing specialized services. The SCP may employ the services of the SDP directly or via a signalling network.

An IP (Intelligent Peripheral) provides special features, such as announcements and dual tone multifrequency (DTMF) detection.

An SSCP (Service Switching and Control Point) consists of an SCP and SSP in one node (i.e. if the SSP node of FIG. 2 contains both the SCF and the SDF entities, an SSCP is in question).

The tasks of an SMP (Service Management Point) include management of the database (SDP), network monitoring and testing, and gathering of network data. It may connect to all other physical entities.

An SCEP (Service Creation Environment Point) is employed for determining, developing and testing of IN services, and inputting the services to the SMP.

An adjunct (AD) is functionally equivalent to a service control point SCP but it is directly connected to a SSP by a high-speed data link (e.g. ISDN 30B+D interface) and not via an SS No. 7 network.

An SN (Service Node) may control the IN services and carry out data transfer with the users. It communicates with one or more SSPs directly.

An SMAP (Service Management Access Point) is a physical entity offering a connection to the SMP for specific users.

In the above, an intelligent network has been outlined as a background to describing the method according to the invention. A reader interested in the topic may obtain a more thorough understanding of an intelligent network from e.g. ITU-T recommendations Q.121X or Bellcore AIN recommendations.

To facilitate comprehending the method according to the invention, a call state model, referred to in the above, will be described. The components illustrating the model are PIC (Points In Call), DP (Detection Points), transitions and events. The PICs identify those CCF functions that are required to complete one or more call/connection states. The DPs detect the points in the calling and connection process at which transfer of control to the IN may take place. (Next to the DPs there is a name referring to them; in the ETSI (European Telecommunications Standard Institute) standards the names relate to the DPs themselves, whereas in the ITU-T standards the names are associated with the messages transmitted by the SSF to the SCF from the DP in question.) The transitions indicate a normal flow of a call/connection process from a PIC to another. Events cause transitions into and from the PIC. A thorough description will not be given here; for a detailed description, reference is made to the recommendation Q.1214. In the following, the PICs are briefly described.

FIG. 3 shows an O_BCSM (Originating Basic Call State Model) according to recommendation Q.1214. A PIC 1 (0_Null & Authorize_Origination_Attempt) input event is disconnecting the previous connection (DP 9 or DP 10). The function is to set the interface to idle mode and to check the authority of the calling party (the calling party's authority to carry out a call with given properties is checked). At PIC 2, initial information is gathered from the calling party. Such information includes e.g. service codes and dialled address digits. At PIC 3, the information obtained is analyzed to determine a routing address and call type (e.g. a local exchange call/transit exchange call/international exchange call). At PIC 4, e.g. routing of the call is carried out. An initiation information is transmitted to the terminating half BCSM model, and call control is transferred to the terminating half. The entry event of PIC 5 is constituted by an indication from the terminating half BCSM that the call has been answered by the called party. The function is establishment of connection between calling and called parties, and collection of charging data. Exit events are a service request from the calling party (DP 8), information on that either the calling or called party has disconnected the call (DP 9), or occurrence of a connection failure (transition to PIC 6). At PIC 6, default and exception conditions are handled.

FIG. 4 illustrates a T_BCSM (Terminating Basic Call State Model) according to the recommendation Q.1214. The entry event of PIC 7 is disconnecting and clearing of a previous call (DP 17 or DP 18), or default handling of exceptions by SSF/CCF completed (PIC 11). The function is to set the interface to idle state, and verification of authority (authority to route the call to the called party). At PIC 8, the available resource is selected, and the called party is informed of the incoming call. The exit events are alerting the terminating party (transition to PIC 9), available resources or the called party being busy (DP 13), the call being answered by the called party (DP 15), or the calling party abandoning the call (DP 18). At PIC 9, an indication is sent to the originating half BCSM that the called party is being alerted, and an answer by the called party to the call is awaited. The exit events are that the called party does not answer within a specified time period (DP 14), the called party answers the call (DP 15), or the calling party abandons the call (DP 18). A transition to PIC 10 takes place when the called party answers the call. At PIC 10, an indication is sent to the originating half BCSM that the called party has answered the call, and a connection is established between the calling and the called parties. The exit events are: a service request is received from the called party (DP 16), a disconnect indication is received from either the calling or the called party (DP 17), or a failure occurs (transition to PIC 11). At PIC 11, default and exception conditions are handled.

A large number of various kinds of services may be offered in an intelligent network, such as ABD (Abbreviated Dialing), AAB (Automatic Alternative Billing), and CF (Call Forwarding). The services cannot, however, be implemented in a versatile manner from the point of view of the called party (B subscriber), but they are for the most part services for the calling party (A subscriber). This results from the fact that possibilities to control a service are much more many-sided in the originating half BCSM. (As also indicated by FIGS. 3 and 4, interception of calls and charging related thereto, gathering data from a user and release and completion of a call attempt and continuation, among other things, are possible in a versatile manner only according to the originating half BCSM.)

SUMMARY OF THE INVENTION

It is an object of the present invention to provide an improvement over the drawback described above by producing a new type of method for controlling a call or a call attempt. This object is achieved by the method according to the invention, by returning in response to a service request from processing that employs a terminating half of a basic call state model, the processing of a call attempt to a first point employing an originating half of a basic call state model, and resuming processing according to the originating half of the basic call state model.

The idea of the invention is to return the control of a call attempt to the call control employing the originating half BCSM in case an IN service is initiated from the terminating half BCSM. The call control employing the originating half BCSM may, following this, initiate a new IN service or it may continue processing the call attempt directly using the information that was possibly determined by the IN service initiated by the terminating half.

With the solution according to the invention, the advantage is obtained that the B subscriber may also be provided with as versatile IN services as possible. In some signalling systems, call routing may be returned back to a specific point in the network. If compared with such a method, the present invention clearly provides more versatile control possibilities as the operations to be executed are not restricted solely to e.g. re-routing.

BRIEF DESCRIPTION OF THE DRAWINGS

In the following, the invention and its preferred embodiments will be described in closer detail, referring by way of example to FIG. 5 in the accompanying drawings in which.

PREFERRED EMBODIMENTS OF THE INVENTION

Figure 1:
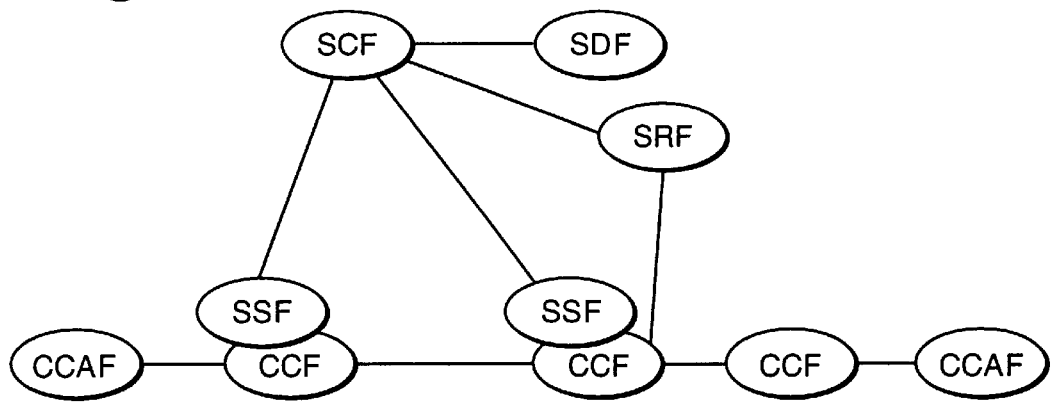
FIG. 1 illustrates the functional architecture of an intelligent network.
Figure 5:
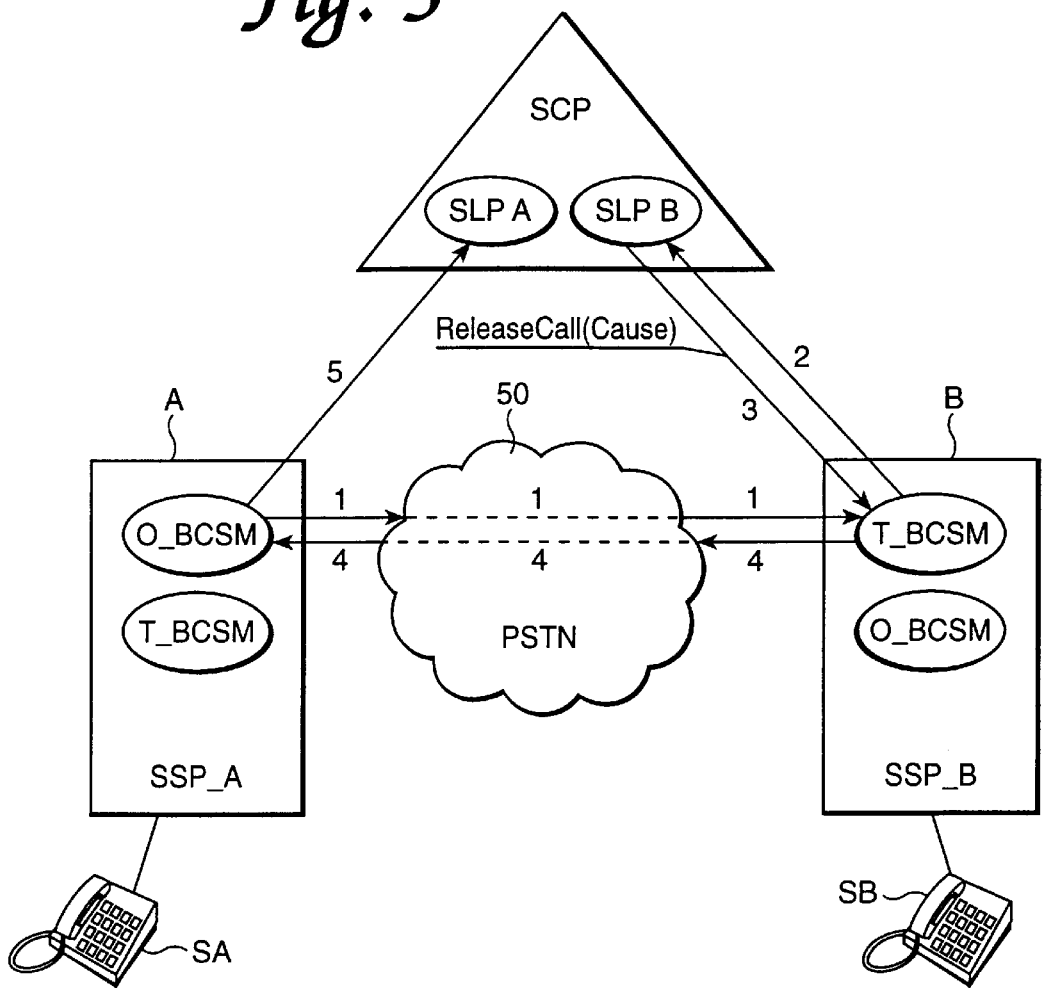
FIG. 5 illustrates the method according to the invention applied in a telephone network.
Figure 2:
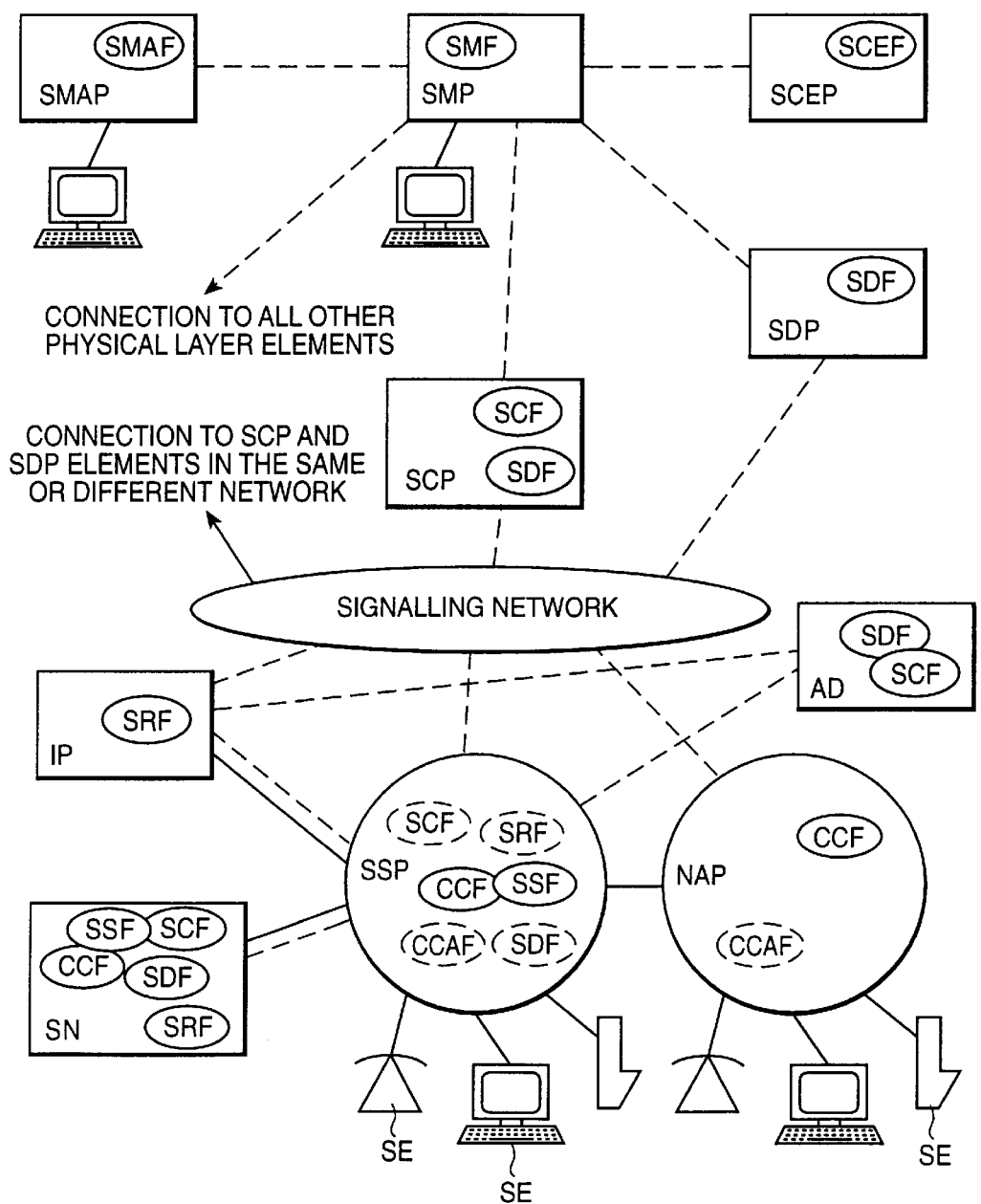
FIG. 2 illustrates the physical architecture of an intelligent network.

The example of FIG. 5 illustrates two terminal exchanges, denoted by reference marks A and B, connected to a public switched telephone network 50. A subscriber equipment SA is connected to the exchange A and a subscriber equipment SB to the exchange B. In this exemplary case, the subscriber with the subscriber equipment SA places a call to the subscriber with the subscriber equipment SB. Both the exchanges are service switching points SSP, and thus have a corresponding function (SSF).

Figure 3:
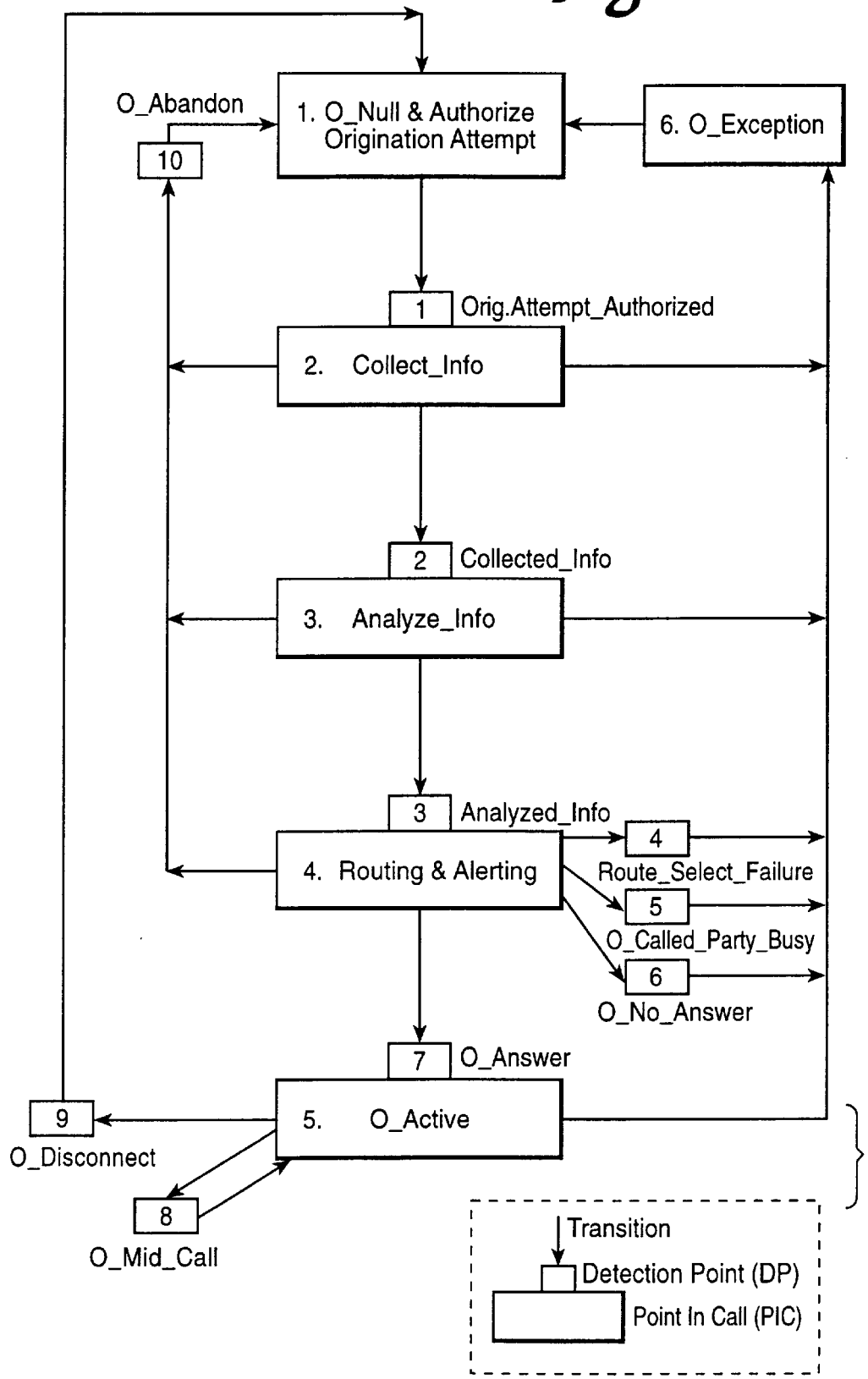
FIG. 3 shows the call state model of a calling party.
Figure 4:
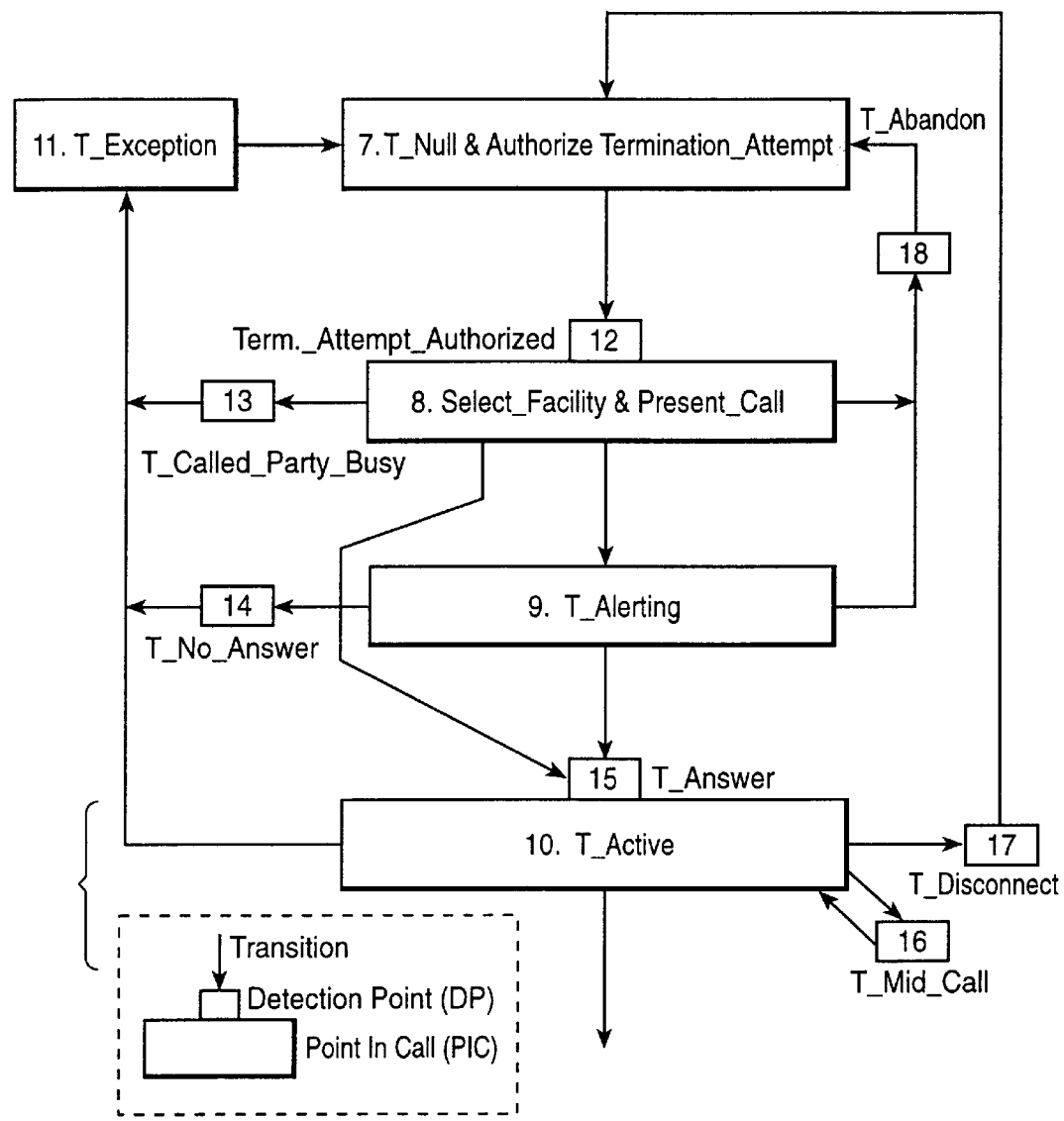
FIG. 4 shows the call state model of a called party.

At the beginning of the call setup, the exchange A receives information on the A subscriber's desire to make a call. This information may be received in e.g. a Setup message according to the standard Q.931, or the exchange may recognize closing of the subscriber loop as a result of an offhook by the subscriber. As a result of the information, a transition is made to PIC 2 in the call state model of FIG. 3, and further to PIC 3 after the subscriber's right to make the call has been established. At PIC 4, the call state model T_BCSM of the called party is activated. This leads the A subscriber's exchange to transmit an initial message via the signalling network to the B subscriber's exchange. The initial message may be either an IAM message (Initial Address Message) if a common channel signalling system employs an ISDN User part ISUP (ISDN User Part) as the user part, or an IAI message (Initial Address message with additional Information) if a TUP (Telephone User Part) is used as the user part. In FIG. 5, the sending of such a initial message is denoted by a circled 1. As a consequence of the initial message, the B subscriber's exchange begins processing of the call attempt in compliance with the terminating half call state model T_BCSM (FIG. 4).

At a specific processing stage, an IN service using the terminating half BCSM is triggered at a service switching point SSP_B located at the B subscriber's exchange. This IN service is denoted with the reference mark SLP_B. The triggering may take place from any conditional or unconditional trigger point (TDP-R). (For example, DP 2 is an unconditional trigger point, because a forward trigger takes place as soon as all information required has been gathered.)

A conditional trigger point may be represented by e.g. the phone of the called subscriber being busy (DP 13, FIG. 4), if a condition is set that the busy tone is listened to, for example, 10 seconds exactly, or that the called subscriber does not answer within a specified time period (DP 14). The SSP_B in such a case sends an Initial_DP message to the service control point SCP, whereby an IN service SLP_B is initiated at the service control point. In FIG. 5, the sending is denoted with a circled 2. Simultaneously in SSP_B, call processing is frozen to await instructions from the SCP. (The Initial_DP is a message between the SSF and the SCF, specified in the standards and generated by the SSF upon detecting a service request at any DP of the call model. In the B subscriber's subscriber data, in turn, it has been determined that being busy or failing to respond signifies a service request.)

In their communication, the SSP and the SCP employ an INAP protocol (Intelligent Network Application Protocol, described in the ETSI standard ETS 300 374-1, September 1994). As this communication takes place as in prior art, it is not described here in any closer detail.

According to the invention, the IN service in question (SLP_B) initiates return of the call attempt control function to the O_BCSM. The return may be initiated either immediately or, for example, after a user interaction in which case e.g. the user has been provided with the desired information. The return may be implemented by employing, in a Cause field of a ReleaseCall message transmitted by the SCP, a value reserved for this purpose. This value, indicative of return of control, may be network operator specific or employed even more widely. The ReleaseCall message sent by the SCP is a message used for releasing the connection at any stage of the call. The message includes a cause value from which the release method may normally be deducted. According to the invention, a value indicating the return of control is also used on this field, such a value having been set a trigger to another IN service at the service switching point (SSP_A). In FIG. 5, the sending of the ReleaseCall message is denoted with a circled 3. (It should be pointed out that the ReleaseCall message is not a response that would always be given to a message from DP 13 or DP 14; in the same situation a User_interaction message etc. may as well be sent and additional instructions be asked from the subscriber, or additional information on the call attempt be transferred to the subscriber.)

Hence, the SCP sends a ReleaseCall message containing the cause value first to the SSP_B call control (T_BCSM), which in the example used was left waiting either at DP 13 or DP 14, depending on whether the B subscriber was busy or did not answer within a specified time. As a result of the ReleaseCall message, a message with a cause value will be sent from one of said points to the SSP_A originating half call control, which was left waiting at PIC 4. In FIG. 5, the sending of the message is denoted with a circled 4. Receiving the message at the SSP_A causes in the originating half call state model a transition to DP 4, at which a conditional triggering is set for the cause value employed. As the cause value received along with the message is detected at the detection point, an Initial_DP message will be transmitted from the detection point (DP 4) in question to the IN service SLP_A active at the SCP, thus causing initiation of the IN service in question. This stage is denoted with a circled 5. After this, call control is managed by SLP_A. So, a transition to DP 4 takes place at the originating half in case the cause value employed by the service program SLP_B does not specifically determine a "B busy" or "B does not answer" situation (in which case transition takes place at the originating half to DP 5 or DP 6, respectively).

In addition to the cause value, such diagnostic information may also be transferred to the IN service (SLP_A) to be initiated which relates to the services cooperation and which was determined at an earlier stage by the SLP_B after receiving an Initial_DP message from the SSP_B. This diagnostic information is transferred transparently in a network employing ISUP signalling.

After the procedures described above the connection will be released.

Although the invention has in the above been described with reference to the examples of the attached drawings, it is obvious that the invention is not restricted thereto but may be modified within the inventive idea disclosed above and in the attached claims. In the disclosure above, the processing steps according to the originating and terminating half call models take place in different exchanges but they could just as well occur in the same exchange in case the subscribers are subscribers of the same exchange. The IN services SLP_A and SLP_B, in turn, have been shown in the same SCP, but they may equally well be physically located at different SCP nodes of the network.

What is claimed is:

1. A method for controlling a call attempt by employing an intelligent network, the method comprising:

processing the call attempt according to an originating half of a basic call state model at a first point having a service switching function, resuming the processing of the call attempt according to a terminating half of the basic call state model at a second point having the service switching function, providing a service request from the processing that employs the terminating half of the basic call state model to a point having a service control function, and returning, in response to the service request, the processing of the call attempt to the first point employing the originating half of the basic call state model, and resuming the processing according to the originating half of the basic call state model.

2. A method as claimed in claim 1, wherein the returning is carried out by employing a value signifying return in a Cause code of a ReleaseCall message transmitted by the point having the service control function.

3. A method as claimed in claim 1, further comprising providing a new service request from the processing employing the originating half of the basic call state model to the point having the service control function.

4. A method as claimed in claim 2, further comprising transferring, along with the Cause code, service-related information determined by the point having the service control function.

5. A method as claimed in claim 4, further comprising resuming, in response to the returning, processing of the call attempt according to the originating half of the basic call state machine directly on the basis of said information.

6. A method as claimed in claim 5, further comprising transferring, along with the Cause code, a number to which the call is to be rerouted.

7. A method as claimed in claim 3, wherein the first point having the service switching function and the second point with the service switching function are in different SSP nodes of the intelligent network.

8. A method as claimed in claim 3, wherein the first point having the service switching function and the second point having the service switching function are in a same service switching point SSP of the intelligent network.

9. A method as claimed in claim 3, wherein the service request provided from the processing that employs the originating half of the basic call state model is sent to a same point having a service control function as the service request that was provided from the processing that employs terminating half of the basic call state model.

10. A method as claimed in claim 3, wherein the new service request provided by the processing that employs the originating half of the basic call state model is sent to a different SCP node of the intelligent network than the service request provided by the processing that employs the terminating half of the basic call state model.

11. A system for controlling a call attempt by employing an intelligent network, the system comprising:

means for processing the call attempt according to an originating half of a basic call state model at a first point having a service switching function, means for resuming the processing of the call attempt according to a terminating half of the basic call state model at a second point having the service switching function, means for providing a service request from processing that employs the terminating half of the basic call state model to a point having a service switching function, and means for returning, in response to the service request, the processing of the call attempt to the first point employing the originating half of the basic call state model, and resuming the processing according to the originating half of the basic call state model.

12. The system of claim 11, wherein the means for returning is carried out by employing a value signifying return in a Cause code of a ReleaseCall message transmitted by the point having the service control function.

13. The system of claim 1, further comprising means for providing a new service request from processing employing the originating half of the basic call state model to the point having the service control function.

14. The system of claim 12, further comprising means for transferring, along with the Cause code, service-related information determined by the point having the service control function.

15. The system as claimed in claim 14, further comprising means for resuming, in response to the means for returning, processing of the call attempt according to the originating half of the basic call state machine directly on the basis of said information.

16. The system of claim 15, further comprising transferring, along with the Cause code, a number to which the call is to be rerouted.

17. The system as claimed in claim 13, wherein the first point having the service switching function and the second point with the service switching function are in different SSP nodes of the intelligent network.

18. The system as claimed in claim 13, wherein the first point having the service switching function and the second point having the service switching function are in a same service switching point of the intelligent network.

19. The system of claim 13, wherein the service request provided by the means for providing a new service request is sent to a same point having a service control function as the service request that was provided by the means for providing the service request from processing that employs the terminating half of the basic call state model.

20. The system as claimed in claim 13, wherein the new service request provided by the means for providing the new service request is sent to a different SCP node of the intelligent network than the service request provided by the means for providing the service request from processing that employs the terminating half of the basic call state model.

* * * * *